United States Patent [19]

Findeis et al.

[11] 4,335,956
[45] Jun. 22, 1982

[54] METHOD AND APPARATUS FOR ADJUSTING ASSOCIATED PHOTOGRAPHIC COPYING AND DEVELOPING MACHINES

[75] Inventors: Günter Findeis, Sauerlach; Berthold Fergg, Taufkirchen; Viktor Osegowitsch, Taufkirchen am Wald; Hans P. Huber, Munich; Heinz Meckl, Bergisch Gladbach, all of Fed. Rep. of Germany

[73] Assignee: Agfa-Gevaert Aktiengesellschaft, Leverkusen, Fed. Rep. of Germany

[21] Appl. No.: 132,803

[22] Filed: Mar. 24, 1980

[30] Foreign Application Priority Data

Mar. 23, 1979 [DE] Fed. Rep. of Germany ....... 2911567

[51] Int. Cl.³ .................... G03B 27/32; G03B 27/52
[52] U.S. Cl. ......................................... 355/27; 355/46; 355/77; 355/132
[58] Field of Search ................... 355/46, 77, 27, 28, 355/132, 68, 83

[56] References Cited

U.S. PATENT DOCUMENTS 4,222,661  9/1980  Wahli et al. ................ 355/77 X
4,239,384 12/1980  Trieber ........................ 355/77 X

*Primary Examiner*—Richard A. Wintercorn
*Attorney, Agent, or Firm*—Kontler & Grimes

[57] ABSTRACT

The condition of a photographic copying and associated developing machine for prints of color photographic negatives is evaluated by exposing a calibrating sample onto a first portion and by making a test exposure with preselected exposure data onto a second portion of photographic paper in the copying machine. The two portions of photographic paper are then developed in the developing machine, and the thus obtained developed prints are monitored in the copying machine by comparing their densities in various colors with preselected reference densities. The results of comparison are indicative whether the machines operate satisfactorily, whether the copying machine requires one or more adjustments, or whether the developing machine is in need of at least one adjustment. The adjustment or adjustments can be effected automatically or upon examination of the results of comparison by an attendant.

32 Claims, 6 Drawing Figures

METHOD AND APPARATUS FOR ADJUSTING ASSOCIATED PHOTOGRAPHIC COPYING AND DEVELOPING MACHINES

BACKGROUND OF THE INVENTION

The present invention relates to a method and apparatus for adjusting, if necessary, associated photographic copying and developing machines. More particularly, the invention relates to improvements in a method and apparatus for testing the condition of a photographic copying machine and of the associated developing machine in a photographic laboratory or the like. Still more particularly, the invention relates to improvements in a method and apparatus for testing the condition of associated photographic copying and developing machines with resort to so-called calibrating samples, e.g., negatives made on color photographic film of the type used by customers and mailed, delivered or shipped to photographic processing laboratories for development and the making of prints on photographic paper or other suitable photosensitive material.

It is already known to evaluate the condition of a photographic copying machine by resorting to prints of calibrating samples. Such evaluation is carried out on the basis of the assumption that the associated developing machine (i.e., the machine which receives exposed photosensitive material from the copying machine) operates satisfactory, i.e., that the temperature of each bath, the composition of each bath, the drying temperature for developed photographic paper and/or any other factors which influence the quality of the developing operation are within the prescribed (acceptable) limits. Such assumption is warranted in many instances; however, the results of the test are quite misleading if the operation of the developing machine deviates from normal. Thus, it can happen that the results of the testing operation indicate a need for adjustment of the copying machine even though the operation of the copying machine is quite satisfactory whereas the developing machine necessitates one or more adjustments. Therefore, such untimely or unnecessary adjustment of the copying machine results in even more pronounced deviation of the quality of prints from the desired or optimum quality.

OBJECTS AND SUMMARY OF THE INVENTION

An object of the invention is to provide a novel and improved method of testing the condition of the copying machine and/or the associated developing machine in a photographic processing laboratory or the like in such a way that the adjustment, if any, is carried out only upon that machine which is in need of adjustment, i.e., not invariably upon the copying machine as is the practice in accordance with heretofore known proposals.

Another object of the invention is to provide a novel and improved method of automatically testing the condition of and, if necessary, adjusting one or more constituents of a photographic copying machine and/or one or more components of a developing machine which is associated with the copying machine (the term "associated" is intended to denote that the prints which are obtained by copying one or more originals onto photosensitive material in the copying machine are transferred into the developing machine to develop such prints prior to returning the originals, with the corresponding prints, to dealers or customers).

A further object of the invention is to provide a novel and improved method of testing associated photographic copying and developing machines with resort to calibrating negatives or the like.

An additional object of the invention is to provide a method which can be resorted to by utilizing a simple, compact and inexpensive apparatus capable of being incorporated into or combined with existing copying and developing machines.

A further object of the invention is to provide a novel and improved apparatus for the practice of the above outlined method.

Another object of the invention is to provide the apparatus with novel and improved means for imaging calibrating samples onto photosensitive material.

A further object of the invention is to provide a photographic copying machine which embodies the above outlined apparatus.

Still another object of the invention is to provide a method and an apparatus which render it possible to automatically or otherwise discriminate between the results of various tests in order to determine whether the associated machines operate satisfactorily, whether both machines require at least some adjustment, or whether only one of the machines must be adjusted in order to ensure that the quality of prints issuing from the developing machine will meet the specifications.

An additional object of the invention is to provide a method which can be performed at regular or irregular intervals in order to ascertain the condition of the photographic copying and/or developing machine whenever the operator or operators so desire, in accordance with a predetermined pattern (such as daily) or whenever the quality or lack of quality of the ultimate products dictates or warrants a thorough testing of the two machines.

One feature of the invention resides in the provision of a method of testing the condition of a copying machine and an associated developing machine for color prints. More particularly, the improved method involves testing of associated copying and developing machines by resorting to a calibrating sample and includes the steps of exposing the image of the calibrating sample (e.g, a negative frame of color film) onto a first portion of a given photosensitive material (e.g., photographic paper which is used for the making of prints from color photographic negatives) in the copying machine, exposing a test print onto a second portion of the same photosensitive material under predetermined circumstances, developing the exposed portions of photosensitive material in the developing machine, monitoring a characteristic of each of the thus developed portions of photosensitive material, comparing the monitored characteristics of the two developed portions with predetermined reference characteristics, and evaluating the condition of at least one of the two machines as a function of the outcome of the comparing step.

The aforementioned circumstances preferably include exposing the second portion of photosensitive material to predetermined quantities of light of at least one predetermined color.

As a rule, the copying machine will have automatic exposure closure means and the step of exposing the image of the calibrating sample onto the first portion of photosensitive material is then carried out by resorting to such exposure control means.

The characteristic which is monitored is or can be the density of the two developed portions of photosensitive material.

If the difference between the predetermined characteristics and the monitored characteristics exceeds a preselected threshold value, at least one of the machines is or can be adjusted so as to reduce the difference below such threshold value, e.g., below 0.02 percent. The monitoring step can include ascertaining the density of each of the two developed portions of photosensitive material in each of a plurality of different colors (e.g., red, blue and green), and the adjusting step is dispensed with only when the comparison of ascertained densities of the two developed portions of photosensitive material in each of the aforementioned plurality of colors with preselected reference densities for each of such plurality of colors is below the preselected threshold value.

The copying machine will be adjusted when the difference between the monitored density of the developed portion bearing the image of the calibrating sample and the corresponding reference density exceeds the preselected threshold value, e.g., the aforementioned threshold value of 0.02 percent. If the monitoring step includes ascertaining the density of each of the two developed portions of photosensitive material in each of a plurality of different colors, the adjusting step is dispensed with only when the comparison of ascertained density of the developed portion bearing the image of the calibrating sample in at least one of the aforementioned plurality of colors with a preselected reference density denotes a difference which is less than the preselected threshold value.

The developing machine will be adjusted when the differences between the monitored characteristics of the developed portions of photosensitive material and the reference characteristic are at least substantially identical. If the monitoring step includes ascertaining the density of each of the two developed portions in each of a plurality of different colors, the adjusting step (i.e., adjustment of the developing machine) is carried out when the differences between the monitored densities in each of the plurality of colors and preselected reference densities for such colors are at least substantially identical. The just mentioned differences can include the absolute value of density as well as the direction in which the monitored density deviates from the corresponding predetermined reference density.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
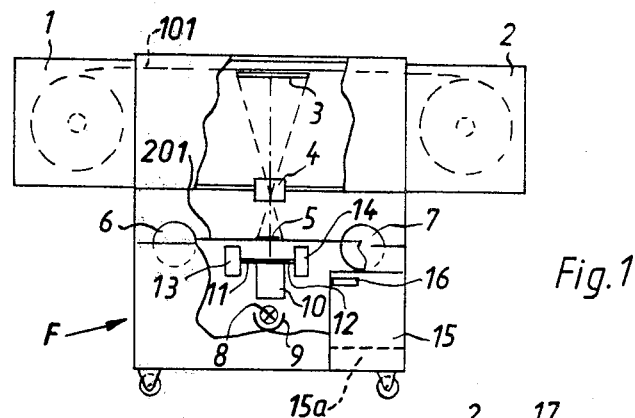
FIG. 1 is a schematic partly elevational and partly sectional view of a photographic copying machine whose condition can be ascertained and which can be adjusted in accordance with the method of the present invention.

Referring first to FIG. 1, there is shown a roll copying machine which is equipped with automatic transporting means for photosensitive material 101. This material is a strip or web of photographic paper which is stored on the core of a reel in a supply cassette 1 and is transported stepwise toward the core of a reel in a takeup cassette 2. The exact construction of the transporting mechanism for photosensitive material 101 forms no part of the invention. All that counts is to ensure that the transporting mechanism can place successive or selected unexposed portions of photosensitive material 101 into register with an opening or window 3 whenever the copying machine is ready to expose the image of an original onto the photosensitive layer of the material 101.

The opening or window 3 is adjacent to a portion of the path of lengthwise movement of photosensitive material 101 toward the takeup cassette 2 so that the image of an original can be focused onto the unexposed portion in the opening 3 by an objective 4 which is installed in the frame F of the copying machine. Copying light is supplied by a light source 8 which is installed in the frame F in front of a reflector 9. Light issuing from the source 8 passes through a light mixing duct 10 which homogenizes the light ahead of an opening or window 5 for an original, e.g., a frame of a web of exposed and developed photographic film 201 which is stored on a supply reel 6 and is collected by a takeup reel 7. The reels 6 and 7 are removably installed in the frame F, the same as the cassettes 1 and 2 for photosensitive material 101. The frame F further contains or supports an automatic transporting mechanism for the exposed and developed film 201, and this transporting mechanism is actuated in synchronism with the aforementioned transporting mechanism for photosensitive material 101 in a manner well known from the art of photographic copying machines. The webs of photographic material 101 and film 201 are transported in stepwise fashion. As a rule, the web of film 201 will consist of a large number of discrete customer films which are spliced to each other, end-to-end, for convenient transport through the associated developing machine, such as the machine 17 schematically illustrated in FIG. 1A.

The frame F contains or supports three so-called subtractive color filters of which only the filters 11 and 12 are shown in FIG. 1. These filters are respectively movable across and away from the path of copying light by discrete electromagnets 13 and 14. The reference character 15 denotes a control unit which comprises means for performing a plurality of functions to be described below. One of these functions involves evaluation of the condition of the copying machine of FIG. 1 and/or the condition of the associated developing machine 17 of FIG. 1A for the purpose of effecting manual, semiautomatic or automatic adjustment or adjustments of such machine or machines when the need arises. The casing of the control unit 15 has a recess or slot 16 for reception of prints, one or more given characteristics of which are to be monitored prior to comparison of the thus ascertained characteristics (e.g., densities in different colors) with one or more predetermined reference characteristics.

The developing machine 17 includes a housing which has means for supporting loaded takeup cassettes 2, i.e., cassettes which are removed from the frame F of the photographic copying machine of FIG. 1. The leader of the web of exposed photosensitive material 101 is threaded through various baths in the housing of the developing machine 17 in a manner not forming part of the invention. The just mentioned housing further contains one or more driers which expel moisture from developed photosensitive material ahead of a takeup reel 18 for a roll of developed photosensitive material. In many instances, the leader of exposed photosensitive material 101 in the cassette 2 which has been transferred from the frame F of the copying machine of FIG. 1 into or onto the housing of the developing machine 17 of FIG. 1A will be attached to the trailing portion of a threading strip of customary design which is utilized to facilitate advancement of the leader of exposed photosensitive material 101 through the baths and other station or stations of the developing machine 17.

Figure 2:
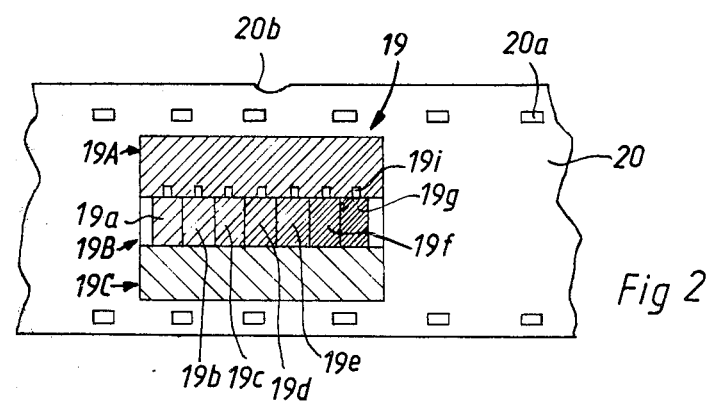
FIG. 2 is a schematic representation of a calibrating sample which can be used for the practice of the improved method.

FIG. 2 shows a calibrating sample 19 which is a negative and can be used to facilitate evaluation of the condition of the photographic copying and/or the associated developing machine. The calibrating sample 19 is exposed onto a frame of photographic film 20 which has one or two customary rows of marginal perforations 20a and a discrete notch 20b serving as a locating means to failitate accurate positioning of the respective frame in a photographic apparatus or in the copying machine of FIG. 1. The frame is exposed in the copying machine of FIG. 1 with resort to the conventional automatic exposure control means (not specifically shown) of such machine, and the thus exposed frame is then developed in the associated machine 17. The material of the film 20 shown in FIG. 2 may but need not be identical with that of one, two, more than two or all films which together constitute the web 201 shown in FIG. 1. The purpose of the aforementioned row or rows of marginal perforations 20a is to facilitate accurate transport of the film 20 in a photographic apparatus and/or in the copying machine of FIG. 1. The notch 20b is scanned in the camera during exposure of successive frames of the film 20 to scene light and/or in the copying machine of FIG. 1 to ensure accurate alinement of the corresponding frame with the opening or window 5 ahead of the optical system or objective 4.

The calibrating sample 19 is subdivided into three elongated sections or strips 19A, 19B and 19C. These sections extend in the longitudinal direction of the film 20. The median section 19B constitutes what can be termed a grey wedge with stepwise transition from a portion or field of lesser density to the neighboring portion or field of greater density. These portions or fields are denoted by the reference characters 19a, 19b, 19c, 19d, 19e, 19f and 19g. The leftmost field 19a is or can be practically transparent, and the rightmost field 19g is the one which exhibits maximum density. The density of the median field 19d is assumed to be approximately 0.7.

The section 19A carries seven synchronizing marks 19i, one for each of the seven fields 19a–19g. The density of the synchronizing marks 19i is preferably even less than that of the field 19a, and their purpose is to facilitate ready and reliable discrimination between the fields 19a–19g. As shown, each synchronizing mark 19i is located substantially midway between the ends of the respective field, as considered in the longitudinal direction of the section 19A and film 20. The means for scanning the section 19A for the presence of synchronizing mark or marks 19i denoting one or more selected fields 19a–19g may include suitable photoelectric detector means, not shown.

The sections 19A and 19C (save for the marks 19i on the section 19A) are exposed in a neutral color and exhibit such density that the density of the entire calibrating sample 19 equals or approximates an average density.

Figure 3:
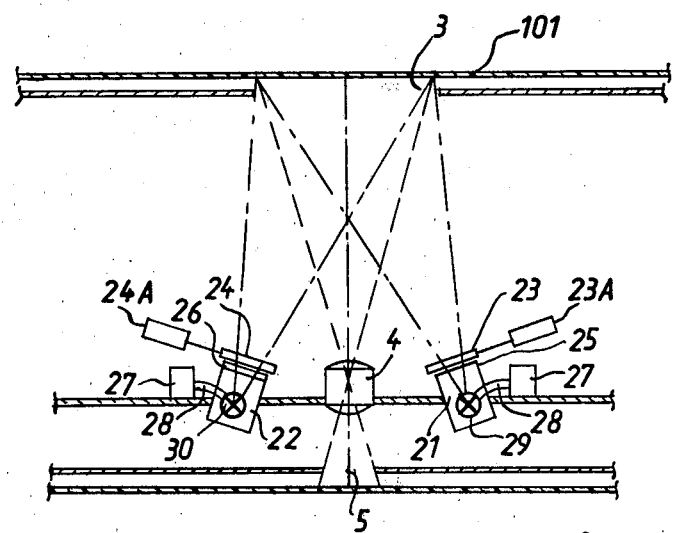
FIG. 3 is a schematic partly elevational and partly sectional view of a portion of the apparatus for making prints which are used, with the prints of calibrating samples, for evaluation of the condition of associated photographic copying and developing machines.

FIG. 3 shows a portion of the automatic exposure control means in the copying machine of FIG. 1. The purpose of the structure which is shown in FIG. 3 is to make a test print (32 in FIG. 4) on an unexposed portion of photosensitive material 101 in the path extending from the supply cassette 1 to the takeup cassette 2. The objective 4 is flanked by and is adjacent to two standard light sources which respectively comprise substantially pot-shaped lamp housings 21, 22 for electric lamps 29, 30. In order to achieve long-lasting constant brightness, the lamps 29 and 30 are preferably connected to an energy source which supplies less than nominal voltage. If desired, the system of FIG. 3 can comprise conventional means for ensuring that the brightness of light issuing from the lamps 29 and 30 remains constant. However, and since it is desirable to have some means for ascertaining whether or not the lamps 29 and 30 are on, the system of FIG. 3 employs, for each of these lamps, a discrete photoelectric monitoring device 27 which receives light by way of a discrete light conductor 28. The purpose of light conductors 28 is to render it possible to install the monitoring devices 27 at a sufficient distance from the respective lamps 29, 30 so as to prevent overheating of such devices. Signals which are transmitted by the monitoring devices 27 are used to regulate the voltage in the circuits of the respective lamps 29, 30 so that the brightness of light which issues from these lamps is at least nearly constant. It is clear that other ways of regulating the brightness of light issuing from the lamps 29 and 30 can be resorted to just as well. For example, signals which are transmitted by the transducers of the monitoring devices 27 can be used to place suitable filters into the paths of light issuing from the respective lamps. In order to ensure that the monitoring of a test print 32 which is obtained by exposing a portion of the photosensitive material 101 will be readily carried out in each of a plurality of different colors and in such a way that signals denoting the selected characteristics of the print 32 can be readily distinguished (i.e., that the intensity of such signals will suffice for convenient evaluation), the structure of FIG. 3 further comprises so-called CC (color correction) filters 25 and 26. The absorptivity of these CC filters may match or approximate that of conversion filters which are used in photographic apparatus in order to make exposures in daylight by utilizing photographic film which is designed for the making of exposures in artificial light.

Still further, the structure of FIG. 3 comprises discrete shutters 23 and 24 for the light sources 29 and 30, and discrete electromagnetic actuating means 23A, 24A for the corresponding shutters. The opening times of the shutters 23 and 24 are relatively long so that they can be selected with a high degree of accuracy. The brightness of lamps 29 and 30 is selected in such a way that, when the exposure time is at least one second, the average density of the print is or approximates 0.7.

Figure 4:
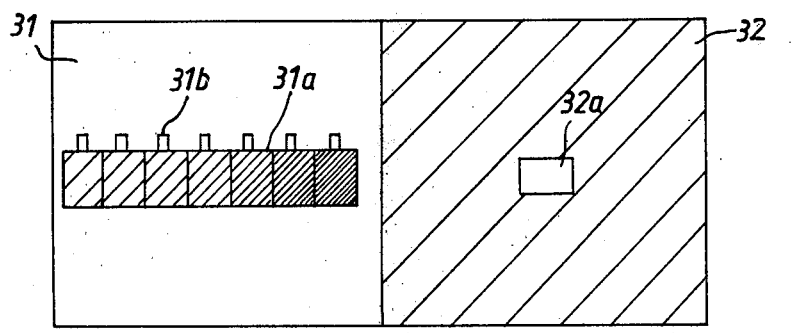
FIG. 4 is a schematic view of two portions of photosensitive material which respectively bear images of a calibrating negative and an image which is exposed in the apparatus of FIG. 3.

FIG. 4 illustrates two neighboring portions 31 and 32 of photosensitive material 101. The portion 31 bears the image of the calibrating sample 19, and the portion or test print 32 is exposed in a manner as described in connection with FIG. 3. The image on the portion 31 includes the image 31a of the median section or wedge 19B and the images 31b of marks 19i. The portions 31 and 32 of photosensitive material 101 are developed, under identical circumstances, in the developing machine 17 and are thereupon trimmed so as to constitute a rectangle which can be inserted into the recess 16 of the control unit 15 shown in FIG. 1.

When introduced into the recess 16 of the control unit 15, the exposed and developed portions 31 and 32 of photosensitive material 101 are monitored to ascertain their densities in each of three different colors. It normally suffices to monitor a single portion of the image 31a (e.g., the image of the median field 19d shown in FIG. 2) and a similar part 32a of the portion or test print 32.

The operation is as follows

Figure 1A:
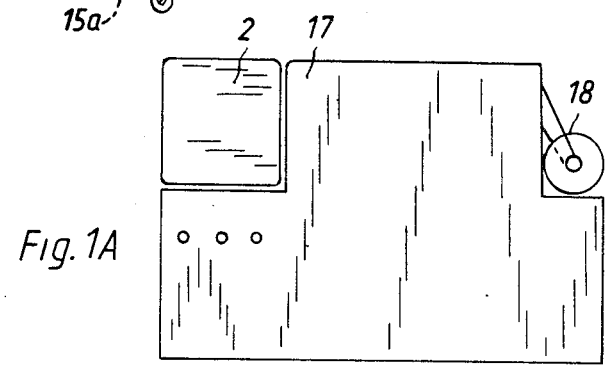
FIG. 1A is a schematic elevational view of the associated developing machine.

The photographic copying machine of FIG. 1 and the associated developing machine 17 of FIG. 1A can be tested for the first time (e.g., immediately after installation in a photographic processing laboratory) or in routine fashion at regular or randomly selected intervals to ascertain deviations, if any, from optimal adjustment of the one and/or the other machine.

In the first step, the calibrating sample 19 of FIG. 2 is placed into the opening 5 shown in FIG. 1 and is imaged onto that (unexposed) portion (31) of photosensitive material 101 between the cassettes 1 and 2 which is in register with the opening 3. The automatic exposure control system of the copying machine regulates the exposure of the calibrating sample 19 in such a way that one obtains a print or portion 31 of average density with a neutral (untinted) gray. This corresponds to normal or average adjustment of the exposure control system in the copying machine. The percentage of various colors is selected by manipulation of the three color filters including those shown at 11, 12 and respectively actuated by electromagnets 13, 14. By way of example, the manner in which the color filters can be manipulated is disclosed in requisite detail in U.S. Pat. No. 3,867,029.

When the imaging of the calibrating sample 19 is completed, the web of photosensitive material 101 is advanced by a step so as to place the portion 32 into register with the opening 3. The portion 32 is then exposed by resorting to the system of FIG. 3, i.e., with the help of the shutters 23 and 24 for an interval of time which is not less than one second. The color of copying light (determined by characteristics of the CC filters 25 and 26 as well as by brightness of light issuing from the lamps 29 and 30) results in the making of a test print having a density of approximately 0.7 in the colors blue, green and red so that each of the three colors can be readily measured or monitored. The two images which have been exposed on the portions 31 and 32 of photosensitive material 101 are thereupon advanced into the interior of the takeup cassette 2 and the latter is transferred into or onto the housing of the developing machine 17 shown in FIG. 1A, i.e., into or onto the housing of the developing machine which is associated with the photographic copying machine of FIG. 1. Since the making of prints 31 and 32 preferably takes place upon completion of exposures of originals (film frames transported from the reel 6 toward the reel 7), the portions 31 and 32 are first to be developed and can be readily separated from the leader of dried photosensitive material 101 which leaves the housing of the developing machine 17 to be collected on the reel for the roll 18.

The portions 31 and 32 are neatly trimmed to accurately fit into the recess 16 of the control unit 15 in the copying machine shown in FIG. 1. The control unit 15 preferably contains or includes a suitable stop which arrests the inserted portions 31 and 32 in an optimum position for monitoring of their characteristics preparatory to evaluation of the condition of the machine of FIG. 1 and/or of the machine of FIG. 1A.

In the next step, the components of the control unit 15 monitor the portions 31 and 32 in the recess 16. As mentioned above, it suffices to monitor the image 31a of the median field 19d and the corresponding part 32a of the portion or test print 32. However, this is optional and the selection of dimensions of those parts of the developed portions 31, 32 which are to be monitored can be made practically at will. The aforementioned parts of the portions 31 and 32 are monitored in each of three different colors. Depending on the nature of equipment in the control unit 15, the monitoring in each of the different colors can be performed seriatim or simultaneously for the portion 31, for the portion 32 or for both portions. It is preferred to monitor a part (32a) of the portion 32 which is remote from the edges of this portion so as to eliminate the influence of eventual unequal illumination of photosensitive material 101 in the opening 3 by the standard light sources 29, 30 during the making of an exposure upon the portion 32.

In order to properly evaluate the results of monitoring of the portions 31 and 32, it is necessary to establish the necessary reference characteristics or desired characteristics for comparison with the corresponding characteristics of monitored parts of the portions 31 and 32. Such reference characteristics can be ascertained empirically or are furnished by the maker or makers of the two machines to be tested. The absolute values of differences between the monitored characteristics o f portions 31, 32 and the reference characteristics can be evaluated, either by an operator or automatically by the control unit 15, to ascertain whether or not the copying machine and/or the associated developing machine 17 requires any adjustment. One can readily distinguish between several situations, namely:

(A) The differences between the monitored characteristics of the portions 31, 32 on the one hand and the corresponding reference characteristics are below a preselected threshold value, e.g., 0.02 percent. This would indicate that the copying machine and the developing machine operate properly, i.e., that they respectively make and develop satisfactory prints. Consequently, no adjustment of either of these machines is required.

(B) The difference between the monitored densities in at least one of the three colors (of the developed image of the median field 19d) and the corresponding reference density exceeds the preselected threshold value (e.g., 0.02). At the same time, the monitored densities of the part 32a of portion 32 in all three colors are such that the difference between such densities and the corresponding reference density or densities is less than the permissible difference. This means that the developing machine 17 operates properly but the copying machine requires at least some adjustment. Such adjustment can be carried out in a manner as disclosed in the commonly owned copending application Ser. No. 132,094 filed Mar. 20, 1980 for "Method and apparatus for adjusting a color copying machine".

(C) The deviations of monitored density from predetermined reference density in one or more colors are the same, as concerns their absolute value as well as the direction of (positive or negative) deviation. However, the extent of at least one difference is greater than the preselected threshold value (e.g., 0.02). This denotes that the copying machine is likely to be in satisfactory condition but the developing machine 17 requires at least some adjustment. Thus, the attendant or attendants are apprised of the fact that the developing machine requires examination and adjustment of one or more of its components.

The results of the just discussed evaluation of the comparing step or steps can be indicated by the control unit 15, e.g., by lighting of certain signal lamps on a control panel or by the printout of a computer 15a if the unit 15 embodies a computer. If the unit 15 is a computerized device, the computer 15a can store a host of information including the results of comparisons between monitored characteristics and reference characteristics and the results of the monitoring operation and/or the reference values, and the computer can furnish signals for automatically performing the comparing step or steps. A computer of such character (the computer 15a is any one of several commercially available devices) is further in a position to specifically pinpoint certain defects or necessary adjustments of the copying and/or associated developing machine in response to detection of certain typical deviations of monitored characteristics from the corresponding reference characteristics. If the difference between the densities in one or more colors is of certain magnitude, the computer 15a can analyze such difference and indicate the nature of adjustment which should be carried out in the developing machine in order to eliminate the deviation or deviations. For example, the results of comparison may be indicative of the fact that the contents of one or more liquid baths in the machine 17 require regeneration. Automatic adjustment of the copying machine can be carried out in response to signals which are generated by the control unit 15 or its computer 15a upon completion of a series of comparing steps. Alternatively, the results of such comparing step or steps can be analyzed by a competent person who thereupon initiates automatic adjustment or undertakes the necessary manual adjustment or adjustments.

Figure 5:
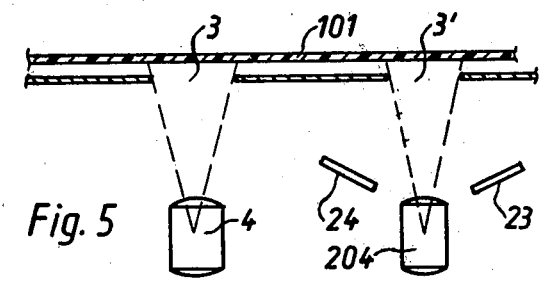
FIG. 5 is a schematic view of a modification of the structure shown in FIG. 3.

If desired, the portion 32 of the photosensitive material shown in FIG. 4 can be exposed at another station of the copying machine of FIG. 1 or outside of this copying machine, e.g., in a contact copying station by resorting to an auxiliary exposure window or opening 3' downstream of the opening 3. This is shown, somewhat schematically, in FIG. 5 which further shows an objective 204 flanked by the shutters 23, 24. The objective 204 is provided in addition to the objective 4.

When the associated copying and developing machines are examined for the first time, the insertion of the two portions 31, 32 shown in FIG. 4 into the recess 16 of the control unit 15 will normally take place by hand. However, routine testing of the two machines can be performed with minimal losses in time by attaching a calibrating sample 19 to the trailing end of a roll of exposed film 201 on the reel 6 so that the portions 31,32 of photosensitive material 101 can be exposed in routine fashion upon completion of exposure of each of a series of originals on the film 201. The calibrating sample 19 can be left on the film 201 or removed for reattachment to the next film 201. In other words, a discrete calibrating sample 19 can be provided on each film 201, or such sample can be separably attached to a film 201 and detached therefrom before the film is severed to yield discrete customer films or sections of customer films which are ready to be returned to customers or dealers, together with the corresponding prints made on photosensitive material 101.

An important advantage of the improved method and apparatus is that a single testing operation suffices to allow for appropriate adjustment of the copying and/or associated developing machine. This is attributable to the fact that the portions 31 and 32 are developed under the same conditions as the prints of originals (frames of the film 201) and in the same developing machine. The exposure of the portion 32 is carried out by resorting to predetermined quantities of light and by resorting to predetermined colors. This renders it possible to evaluate the operation of the developing machine independently of the condition of the copying machine as well as to utilize the print of the calibrating sample 19 for evaluation of the condition of the copying machine without any influence on the part of the developing operation. Otherwise stated, the copy of a calibrating sample can be evaluated for the purpose of ascertaining the condition of the copying maching, without any distortion of the evaluating operation due to the fact that the portion 31 of the material 101 was developed in the associated machine 17.

A computer which can be used in or in association with the control unit 15 is manufactured by Digital Equipment Corporation under the designation PDP 11/23.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of testing the condition of a copying machine and an associated developing machine for color prints with resort to a calibrating sample, comprising the steps of exposing the image of the calibrating sample onto a first portion of a given photosensitive material in the copying machine; exposing a test print onto a second portion of such photosensitive material under predetermined circumstances; developing the thus exposed portions of photosensitive material in the developing machine; monitoring a characteristic of each of the thus developed portions of photosensitive material; comparing the monitored characteristics with predetermined reference characteristics; and evaluating the condition of at least one of said machines as a function of the outcome of said comparing step.

2. The method of claim 1, wherein said circumstances include exposing said second portion of photosensitive material to predetermined quantities of light of at least one predetermined color.

3. The method of testing the condition of a copying machine having automatic exposure control means and of a developing machine which is associated with said copying machine as defined in claim 1, wherein said step of exposing the image of the calibrating sample onto said first portion of photosensitive material is carried out with resort to said exposure control means.

4. The method of claim 1, wherein said characteristic is the density of said developed portions of photosensitive material.

5. The method of claim 1, further comprising the step of adjusting at least one of said machines when the differences between said predetermined characteristics and each of said monitored characteristics exceeds a preselected threshold value.

6. The method of claim 5, wherein said threshold value is 0.02 percent.

7. The method of claim 5, wherein said monitoring step comprises ascertaining the density of each of said developed portions in each of a plurality of different colors and said adjusting step is dispensed with only when the comparison of ascertained densities of said developed portions in each of said plurality of colors with preselected reference densities for each of said plurality of colors is below said threshold value.

8. The method of claim 1, wherein said characteristic is the density of each of said developed portions and further comprising the step of adjusting said copying machine when the difference between the monitored density of the developed portion bearing the image of the calibrating sample and the corresponding reference density exceeds a preselected threshold value.

9. The method of claim 8, wherein said threshold value is 0.02 percent.

10. The method of claim 8, wherein said monitoring step comprises ascertaining the density of each of said developed portions in each of a plurality of different colors and said adjusting step is dispensed with only when the comparison of the ascertained density of the developed portion bearing the image of said calibrating sample in at least one of said plurality of colors with a preselected reference density denotes a difference which is less than said threshold value.

11. The method of claim 1, further comprising the step of adjusting the developing machine when the differences between the monitored characteristics of said developed portions and the corresponding reference characteristics are at least substantially identical.

12. The method of claim 11, wherein said monitoring step includes ascertaining the density of each of said developed portions in each of a plurality of different colors and said adjusting step is carried out when the differences between the monitored densities in each of said colors and preselected reference densities for each of said colors are at least substantially identical.

13. The method of claim 12, wherein said differences include the absolute value of density and the direction in which the monitored density deviates from the corresponding predetermined reference density.

14. An apparatus for testing the conditions of copying machines and associated developing machines, comprising a copying machine having means for exposing the image of a calibrating sample onto a first portion of photosensitive material and for making a test exposure on a second portion of said photosensitive material under predetermined circumstances; a developing machine arranged to receive said photosensitive material from said copying machine and to develop said first and second portions thereof; and means for sensing a characteristic of each of said first and second portions of said photosensitive material after development, comparing the sensed characteristics with predetermined reference characteristics and evaluating the condition of at least one of said copying machine and developing machine based on the comparison of the sensed and predetermined reference characteristics.

15. The apparatus of claim 14, wherein said exposing means includes at least one standard source of light.

16. The apparatus of claim 15, wherein said copying machine has an opening, means for moving unexposed portions of said photosensitive material into register with said opening, and optical means for imaging originals and said sample onto the portions of photosensitive material in register with said opening, said light source being adjacent to said optical means.

17. The apparatus of claim 15, wherein said copying machine has a first and a second opening, means for moving portions of said photosensitive material into register with said openings, and means for respectively imaging originals and making said test exposure on portions of photosensitive material in register with said first and second openings.

18. The apparatus of claim 15, wherein said source includes at least one electric lamp.

19. The apparatus of claim 18, wherein said source further comprises means for applying to said lamp a substantially constant voltage which is less than nominal voltage for said lamp.

20. The apparatus of claim 19, wherein said lamp is of limited brightness and is operated at less than nominal voltage.

21. The apparatus of claim 18, further comprising color correction filter means for light issuing from said lamp.

22. The apparatus of claim 18, further comprising light monitoring means and light conductor means connecting said lamp with said light monitoring means.

23. The apparatus of claim 15, comprising photoelectric signal generating means for monitoring the intensity of light issuing from said source, means for regulating the intensity of such light as a function of signals which are generated by said monitoring means, and light conducting means connecting said light source with said monitoring means.

24. The apparatus of claim 15, further comprising shutter means interposed between said light source and said second portion of photosensitive material.

25. The apparatus of claim 24, wherein said light source includes a lamp arranged to emit an uninterrupted beam of light and said shutter means is arranged to furnish exposure times of at least one second.

26. The apparatus of claim 25, wherein the density of said test exposure is approximately 0.7.

27. The apparatus of claim 14, wherein said copying machine comprises means for transporting a series of originals into register with said exposing means, said sensing, comparing and evaluating means comprising means for initiating the making of an exposure of said calibration sample and of said test exposure on two adjacent portions of photosensitive material in said copying machine in automatic response to completion of copying of said series of originals.

28. The apparatus of claim 14, wherein said sensing, comparing and evaluating means comprises a control unit having means for monitoring said developed first and second portions of said photosensitive material.

29. The apparatus of claim 28, wherein said control unit has a recess for said developed portions of said photosensitive material.

30. The apparatus of claim 14, wherein said sensing, comparing and evaluating means comprises a computer arranged to compare the sensed and predetermined reference characteristics of said developed portions of said photosensitive material and to generate signals denoting the condition of at least one of said copying machine and developing machine as a function of such comparison.

31. The apparatus of claim 30, wherein said sensing, comparing and evaluating means is an integral part of said copying machine.

32. The apparatus of claim 30, further comprising means for automatically adjusting said copying machine and developing machine, when necessary, in response to said signals.

* * * * *